US012001928B1

(12) United States Patent
Paton et al.

(10) Patent No.: US 12,001,928 B1
(45) Date of Patent: Jun. 4, 2024

(54) SYSTEMS AND METHODS FOR ARTIFICIAL-INTELLIGENCE-ASSISTED PREDICTION GENERATION

(71) Applicant: Cigna Intellectual Property, Inc., Wilmington, DE (US)

(72) Inventors: John E. Paton, Raleigh, NC (US); Armand E. Prieditis, Arcata, CA (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 1102 days.

(21) Appl. No.: 16/834,271

(22) Filed: Mar. 30, 2020

Related U.S. Application Data (60) Provisional application No. 62/826,705, filed on Mar. 29, 2019.

(51) Int. Cl.
*G06N 20/00* (2019.01)
*G06F 17/16* (2006.01)
*G06F 17/18* (2006.01)
*G06F 18/24* (2023.01)

(52) U.S. Cl.
CPC .......... *G06N 20/00* (2019.01); *G06F 17/16* (2013.01); *G06F 17/18* (2013.01); *G06F 18/24* (2023.01); *G06F 2218/20* (2023.01)

(58) Field of Classification Search
None
See application file for complete search history.

(56) References Cited

U.S. PATENT DOCUMENTS

| 6,059,724 | A | * | 5/2000 | Campell | G16H 50/50 128/923 |
|---|---|---|---|---|---|
| 10,191,116 | B2 | | 1/2019 | Aliyev | |
| 10,445,658 | B2 | | 10/2019 | Salas | |
| 10,460,074 | B2 | | 10/2019 | Tekumalla | |

(Continued)

FOREIGN PATENT DOCUMENTS

JP 6569497 B2 * 11/2015 ........... G05B 19/418

OTHER PUBLICATIONS

Gaussian Process Regression for Binned Data; Smith et al., arXiv:1809.02010v2 [stat.ML] May 20, 2019.*

(Continued)

*Primary Examiner* — David J Stoltenberg
(74) *Attorney, Agent, or Firm* — Miller Johnson (57) ABSTRACT

A confidence interval determination system includes a processor and memory. The memory stores a historical data store and instructions. The instructions include, in response to receiving a prediction request, determining a size of each element of the prediction request and obtaining a previous prediction request. The instructions include, in response to the prediction request being different from the previous prediction request, for each element of the prediction request, generating a classifier based on the training data and, for each bin of a set of bins of the element, determining a set of predicted likelihoods using the classifier. The instructions include generating a mean vector prediction and a covariance matrix using the sets of bins generated, determining a predicted outcome and a confidence interval using the mean vector prediction and the covariance matrix, and, in response to the confidence interval exceeding a threshold, outputting the predicted outcome and the confidence interval.

18 Claims, 3 Drawing Sheets

(56) References Cited

U.S. PATENT DOCUMENTS

| | | | |
|---|---|---|---|
| 10,719,327 B1* | 7/2020 | Al-Otoom | G06F 9/3806 |
| 11,568,271 B1* | 1/2023 | Bychkovsky | G06F 8/65 |
| 2003/0233197 A1* | 12/2003 | Padilla | G16B 25/00 |
| | | | 702/179 |
| 2009/0030864 A1* | 1/2009 | Pednault | G06V 10/7625 |
| | | | 706/45 |
| 2013/0262368 A1* | 10/2013 | Wolff | G06N 5/02 |
| | | | 706/52 |
| 2014/0058883 A1* | 2/2014 | Roberts | G06Q 30/0631 |
| | | | 705/26.7 |
| 2014/0279727 A1* | 9/2014 | Baraniuk | G09B 7/00 |
| | | | 706/11 |
| 2015/0032672 A1* | 1/2015 | Prieditis | G06N 20/00 |
| | | | 706/12 |
| 2015/0278711 A1* | 10/2015 | Angelov | G05B 23/024 |
| | | | 706/12 |
| 2015/0379428 A1* | 12/2015 | Dirac | G06N 20/00 |
| | | | 706/12 |
| 2017/0278114 A1 | 9/2017 | Renders | |
| 2017/0372232 A1* | 12/2017 | Maughan | G06F 3/0482 |
| 2018/0165809 A1 | 6/2018 | Stanitsas | |
| 2019/0286242 A1* | 9/2019 | Ionescu | G06N 20/20 |
| 2019/0294990 A1 | 9/2019 | Lopez De Prado | |
| 2019/0311301 A1 | 10/2019 | Pyati | |
| 2019/0366189 A1 | 12/2019 | Plant | |
| 2019/0392397 A1 | 12/2019 | Taylor | |
| 2020/0219004 A1* | 7/2020 | Daly | G06N 20/00 |
| 2020/0302269 A1* | 9/2020 | Ovtcharov | G06N 3/044 |
| 2020/0313736 A1 | 10/2020 | Jana | |
| 2021/0232978 A1* | 7/2021 | Cai | G06N 5/01 |

OTHER PUBLICATIONS

An Extension of PPLS-DA for Classification and Comparison to Ordinary PLS-DA; Telaar et al., PLOS ONE | www.plosone.org Feb. 1, 2013 | vol. 8 | Issue 2 | e55267.*

* cited by examiner

SYSTEMS AND METHODS FOR ARTIFICIAL-INTELLIGENCE-ASSISTED PREDICTION GENERATION

CROSS-REFERENCE TO RELATED APPLICATIONS

This application claims the benefit of U.S. Provisional Application No. 62/826,705 filed Mar. 29, 2019. The entire disclosure of the application referenced above is incorporated by reference.

FIELD

The present disclosure relates to computerized prediction models and more particularly to artificial-intelligence-based computerized prediction models.

BACKGROUND

Decision-making under risk has been contemplated since at least the 18th century. Today, it takes the form of many different models, the most popular of which is Markowitz's risk-return model. In the Markowitz risk-return model, the value of an investment that is to be maximized is modeled as the expected return of the investment minus the variance of the expected return multiplied by a risk factor. The risk factor represents a decision-maker's stance on risk. For example, a risk factor of 0 indicates that the decision-maker is neutral with respect to risk, a positive risk factor indicates that the decision-maker is adverse to risk, and a negative risk factor indicates that the decision-maker is seeking risk. However, most current machine learning regression algorithms produce only a mean vector prediction for the target vector.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A confidence interval determination system includes at least one processor and a memory coupled to the at least one processor. The memory stores a historical data store including training data relating to a particular category and previous prediction requests and instructions for execution by the at least one processor. The instructions include, in response to receiving a prediction request from a user device, determining a size of each element of the prediction request and obtaining a previous prediction request from the historical data store.

The instructions include, in response to the size of each element of the prediction request being different from a size of each element of the previous prediction request, for each element of the prediction request, generating a classifier based on the training data and, for each bin of a set of bins of the element, determining a set of predicted likelihoods using the classifier. The instructions include generating a mean vector prediction and a covariance matrix using the sets of bins generated for each element of the prediction request, determining a predicted outcome and a confidence interval using the mean vector prediction and the covariance matrix, and, in response to the confidence interval exceeding a threshold, outputting, to the user device, the predicted outcome and the confidence interval.

In other features, determining the size of each element of the prediction request includes, for each element of the prediction request, obtaining training data from the historical data store and generating the set of bins based on the obtained training data. In other features, each set of predicted likelihoods includes a probability that an input of the element of the prediction request produces an output categorized in a corresponding bin of the set of bins.

In other features, the instructions include, in response to the size of each element of the prediction request being equal to the size of each element of the previous prediction request, for each element of the prediction request, obtaining a previously stored classifier and using the previously stored classifier to determine the set of predicted likelihoods. In other features, the instructions include, for each element of the prediction request, storing the generated classifier. In other features, each bin of the set of bins is sized based on the training data.

In other features, the set of bins includes a total number of bins and each bin of the set of bins is of varying size. In other features, the classifier for each element is generated based on a value of the training data in each bin. In other features, each generated classifier implements a corresponding function. In other features, each generated classifier is generated based on one of a softmax classifier, a naive Bayes classifier, a probabilistic classifier, or a statistical regression classifier. In other features, the particular category is related to healthcare, weather, or finance.

A confidence interval determination method includes, in response to receiving a prediction request from a user device, determining a size of each element of the prediction request and obtaining a previous prediction request from a historical data store. The historical data store includes training data relating to a particular category and previous prediction requests. The method includes, in response to the size of each element of the prediction request being different from a size of each element of the previous prediction request, for each element of the prediction request, generating a classifier based on the training data and, for each bin of a set of bins of the element, determining a set of predicted likelihoods using the classifier.

The method includes generating a mean vector prediction and a covariance matrix using the sets of bins generated for each element of the prediction request, determining a predicted outcome and a confidence interval using the mean vector prediction and the covariance matrix, and, in response to the confidence interval exceeding a threshold, outputting, to the user device, the predicted outcome and the confidence interval.

In other features, determining the size of each element of the prediction request includes, for each element of the prediction request, obtaining training data from the historical data store and generating the set of bins based on the obtained training data. In other features, each set of predicted likelihoods includes a probability that an input of the element of the prediction request produces an output categorized in a corresponding bin of the set of bins.

In other features, the method includes, in response to the size of each element of the prediction request being equal to the size of each element of the previous prediction request, for each element of the prediction request, obtaining a previously stored classifier and using the previously stored classifier to determine the set of predicted likelihoods. In other features, the method includes, for each element of the prediction request, storing the generated classifier.

In other features, each bin of the set of bins is sized based on the training data. In other features, the set of bins includes a total number of bins and each bin of the set of bins is of varying size. In other features, the classifier for each element is generated based on a value of the training data in each bin. In other features, each generated classifier implements a corresponding function.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Because most current machine learning regression algorithms produce only a mean vector prediction for the target vector, what is needed are methods and systems that are agnostic to the machine learning algorithm and that can produce both a mean vector prediction and a covariance matrix associated with the mean vector prediction. The prediction system of the present disclosure embodies the technical solution of determining the mean vector prediction as well as the covariance matrix. These outputs indicate a predicted outcome and a confidence interval associated with the predicted outcome. In this way, the machine learning algorithms and classifiers can indicate to a user what is being predicted based on training data or historical data as well as a likelihood of the predicted outcome occurring.

Figure 1:
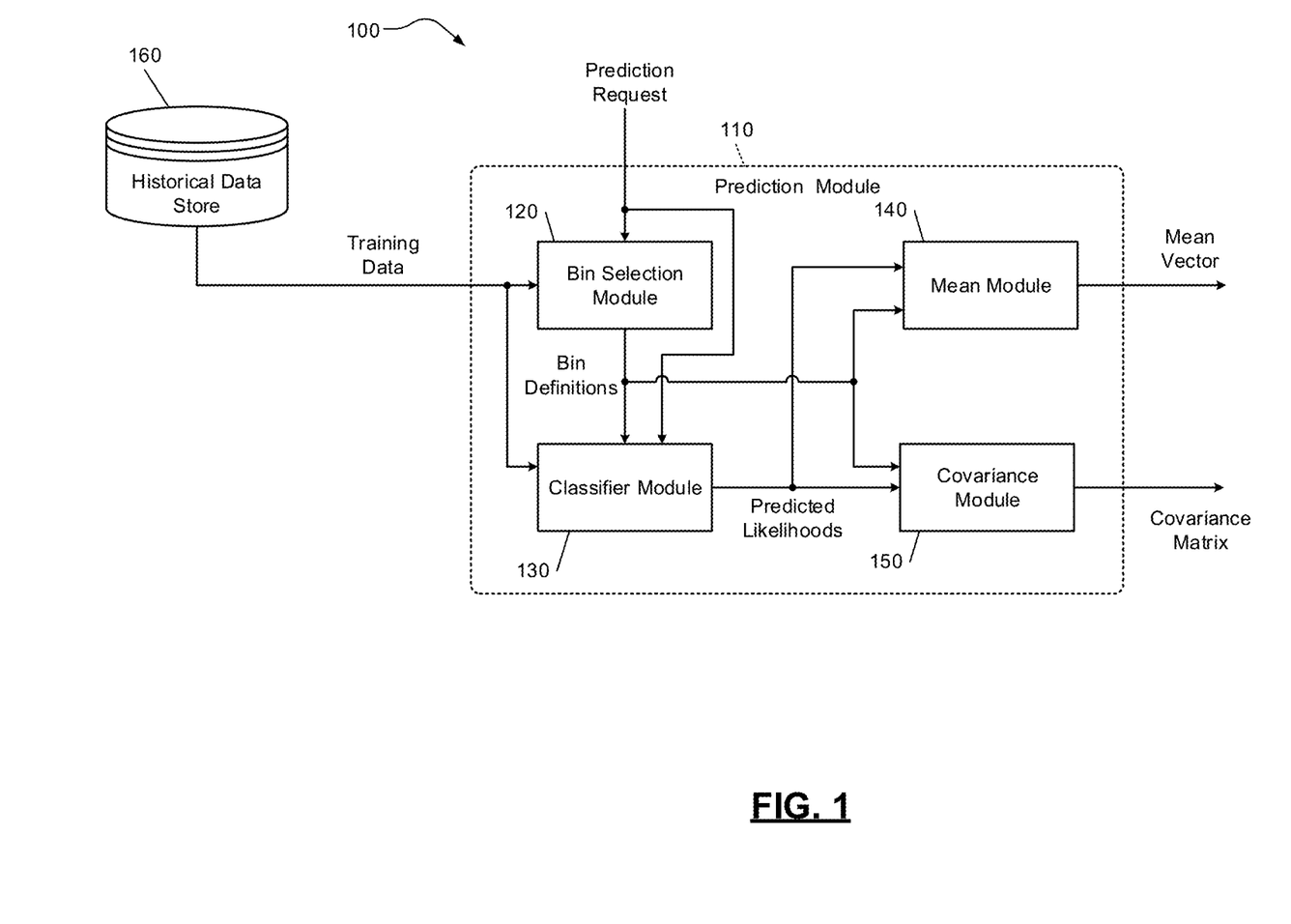
FIG. 1 is a functional block diagram of an example implementation of a system according to the principles of the present disclosure.

In FIG. 1, a system 100 includes a prediction module 110. In response to receiving a prediction request, the prediction module 110 generates (i) a mean vector prediction and (ii) a covariance matrix associated with the mean vector prediction. The received prediction request includes input data (a test case) and defines the format of the mean vector prediction (output). In some implementations, the input in the prediction request may include a single value. As an example, the input data may be today's average temperature and the output may be tomorrow's average temperature. In some implementations, the input in the prediction request may include multiple values. For example, the multiple values of the input may include a medical condition, a treatment type, and a manufacturer. As a further example, the output may be a cost to an insurance provider.

The prediction request may include multiple elements that each define a separate pairing of one or more input values to a single output value. For example, the prediction request may include three elements: today's average temperature as an input and tomorrow's average temperature as an output; today's total rainfall as an input and tomorrow's total rainfall as an output; and today's average barometric pressure as an input and tomorrow's barometric pressure as an output. The covariance matrix associated with the mean vector prediction describes the relationship between the values (outputs) in the mean vector prediction.

The prediction module 110 includes a bin selection module 120, a classifier module 130, a mean module 140, and a covariance module 150. The bin selection module 120 generates a set of bins for each element of the prediction request based on values in training data stored in a historical data store 160 that corresponds to the output of the element. Stated another way, the values of the training data that correspond to the output of the element are grouped into bins by the bin selection module 120, which sizes the bins based on the values of the training data.

In some implementations, the bin selection module 120 generates each set of bins by varying the total number of bins and the width (range) of each bin such that the width of each bin is minimized while still maintaining a minimum number of training data values that fall within each bin. In other implementations, the bin selection module 120 uses bins of equal, fixed width and varies the total number of bins so that every value of the training data falls within a bin. In various other implementations, the bin selection module 120 uses one or more than one binning technique that result in a minimum number of training data values in each bin to generate a set of bins for each output element in the prediction request. The bin selection module 120 provides a definition of the bins for each element to the classifier module 130, the mean module 140, and the covariance module 150.

The classifier module 130 builds a classifier for each element based on the bin definitions for the element and the training data. Specifically, the classifier module 130 builds a classifier for each element based on the values in the training data that correspond to the input and output of the element. Each classifier includes a function that produces a discrete output for a given input. In some implementations, each classifier is a softmax classifier. In other implementations, each classifier may be a naive Bayes classifier, a probabilistic classifier, or a statistical regression classifier.

Once the classifier for each element has been built, the classifier module 130 determines a set of predicted likelihoods for each element. Each set of predicted likelihoods includes, for each bin in the set of bins for the element, a probability that the input for the element included in the prediction request will result in an output that falls within the bin. The classifier module 130 provides the set of predicted likelihoods for each element to the mean module 140 and the covariance module 150.

The bin selection module 120 and the classifier module 130 may determine whether the current prediction request includes the same elements as a previous prediction request—in other words, whether the current prediction request and previous prediction request both have the same number of elements and the same input and output pairings for each element. In response to determining that the current prediction request is the same as the previous prediction request, the bin selection module 120 and the classifier module 130 may determine whether the training data stored in the historical data store 160 has changed since the previous prediction request.

In response to determining that the training data has not changed, the bin selection module 120 may use the previously generated sets of bins for the current prediction request. Similarly, in response to determining that the training data has not changed, the classifier module 130 may use the previously built classifiers to determine the set of predicted likelihoods for the current prediction request. In some implementations, the prediction request always includes the same elements, so that the only check that is made is whether additional or different training data is present.

The mean module 140 generates the mean vector prediction based on the bin definitions from the bin selection module 120 and the predicted likelihoods from the classifier module 130. The mean module 140 creates a 1×m vector (a) or its mathematical equivalent, where m is the number of elements in the prediction request. For example, the mean module 140 may use Equation 1 to generate the vector $\mu_i$.

$$\mu_i = \sum_{j=1}^{n_i} P_{ij} \frac{(b_{ij} - a_{ij})}{2} \quad (1)$$

where $\mu_i$ is the mean of the output of the $i^{th}$ element, $P_{ij}$ is the probability that the inputs of the $i^{th}$ element will fall within the $j^{th}$ bin, $n_i$ is the number of bins in the set of bins for the $i^{th}$ element, $a_{ij}$ is the lower value of the $j^{th}$ bin of the $i^{th}$ element, and $b_{ij}$ is the upper value of the $j^{th}$ bin of the $i^{th}$ element. The mean module 140 outputs the vector $\mu_i$ or its mathematical equivalent as the mean vector prediction.

The covariance module 150 generates the covariance matrix associated with the mean vector prediction based on the bin definitions from the bin selection module 120 and the predicted likelihoods from the classifier module 130. The covariance module 150 creates an m×m matrix (Σ) or its mathematical equivalent, where m is the number of elements in the prediction request. For example, the covariance module 150 may use Equation 2 to generate the matrix E.

$$\Sigma_{i,j} = \sum_{k=1}^{n_i} \sum_{l=1}^{n_j} P_{ik} P_{jl} \frac{(b_{ik} - a_{ik})(b_{jl} - a_{jl})}{12} \quad (2)$$

where $\Sigma_{i,j}$ is the covariance between the output of the $i^{th}$ element and the output of the $j^{th}$ element, $n_i$ is the number of bins in the set of bins for the $i^{th}$ element, $n_j$ is the number of bins in the set of bins for the $j^{th}$ element, $P_{ik}$ is the probability that the input of the $k^{th}$ element will result in an output that falls within the $i^{th}$ bin, $P_{jl}$ is the probability that the input of the $l^{th}$ element will result in an output that falls within the $j^{th}$ bin, $a_{ik}$ is the lower value of the $k^{th}$ bin of the $i^{th}$ element, $b_{ik}$ is the upper value of the $k^{th}$ bin of the $i^{th}$ element, ail is the lower value of the $l^{th}$ bin of the $i^{th}$ element, and $b_{il}$ is the upper value of the $l^{th}$ bin of the $i^{th}$ element. The covariance module 150 outputs the matrix Σ or its mathematical equivalent as the covariance matrix.

The mean vector prediction (μ) outputted by the mean module 140 and the covariance matrix (Σ) outputted by the covariance module 150 may be used to make a risk inclusive decision. For example, Equation 3 may be used to minimize the expected values and Equation 4 may be used to maximize the expected values.

$$\text{min Expected Values} = (\mu + V\Sigma)W \quad (3)$$

$$\text{max Expected Values} = (\mu - V\Sigma)W \quad (4)$$

where V is a 1×m weighting factor vector of the covariance matrix (Σ)—for example, the level of risk associated with each element in the covariance matrix (Σ) that the decision-maker is willing to take. W is an m×1 weighting factor vector that defines how each element should be combined.

The mean vector prediction (μ) and the covariance matrix (Σ) may also be used to determine a confidence interval associated with the prediction for a desired percentage. The confidence interval is a measure of how likely the generated prediction is to fall within the desired percentage. The confidence interval may be used in a decision making process.

For example, based on the mean vector prediction and the covariance matrix, an interval symmetric around the mean with an area corresponding to a desired percentage level may be determined. For example, if a 95% confidence level is desired, an interval can be determined such that the area underneath the normally distributed curve corresponds to 95% of the total area, which is symmetric about the mean. For example, if the mean is 70 and the standard deviation is 5, a 95% confidence level is found between 68.6 (70−1.39) and 71.4 (70+1.39). Note that this interval is symmetric about the mean of 70 because the interval is 1.39 off the mean on each side of the mean.

The mean vector prediction (μ) and the covariance matrix (Σ) may also be used to make additional predictions. Specifically, values of the multivariate distribution including the mean vector prediction and covariance matrix may be sampled and used as inputs for a prediction request. In other words, the results of one prediction may be used as the input for another prediction.

Flowcharts

Figure 2:
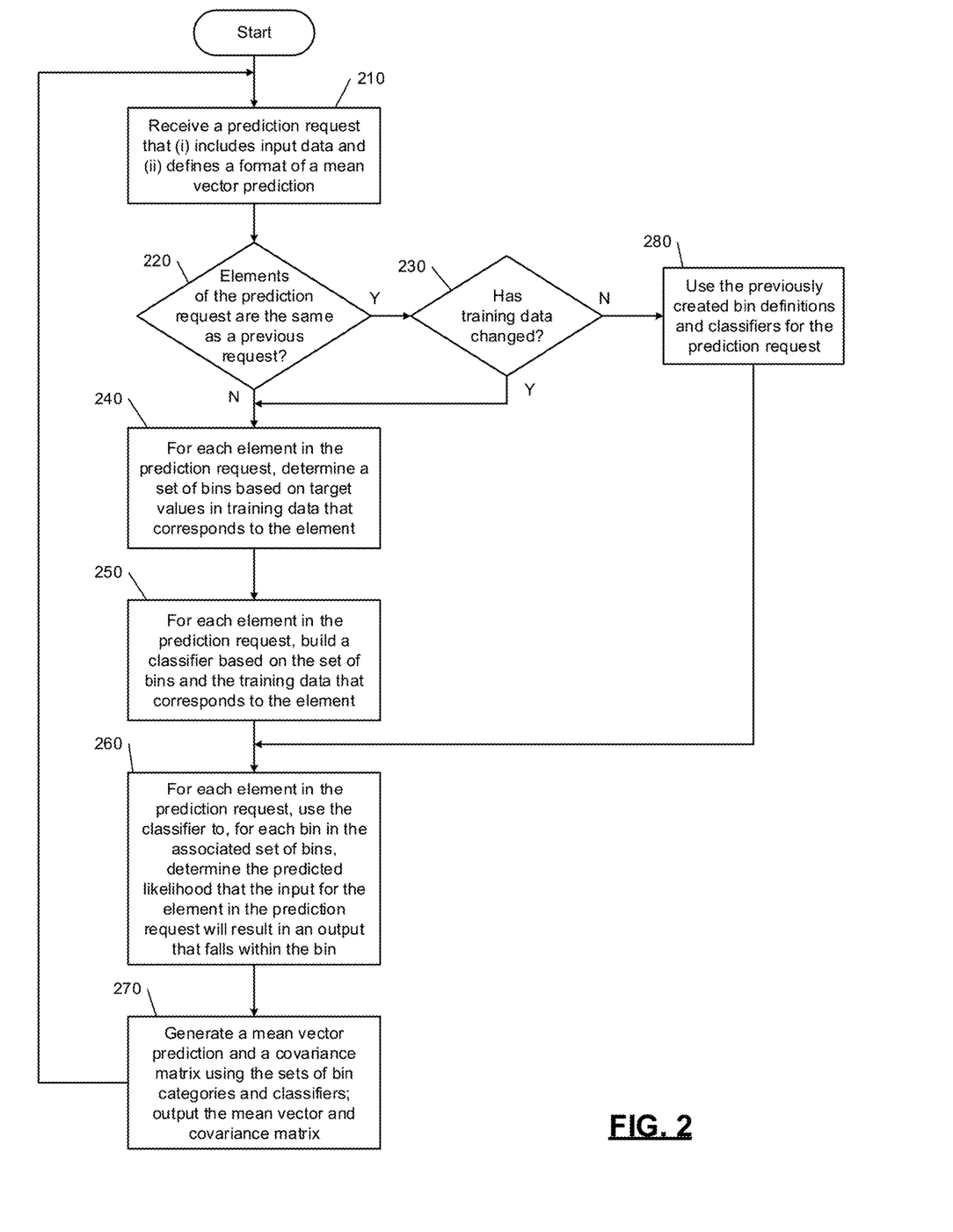
FIG. 2 is a flowchart of example creation of a mean vector prediction and an associated covariance matrix according to the principles of the present disclosure.

In FIG. 2, creation—for example, by the prediction module 110—of a mean vector prediction and an associated covariance matrix begins at block 210. At block 210, control receives a prediction request that includes input data and defines the format of the mean vector prediction. Control progresses to block 220, where control determines whether the elements of the received prediction request are the same as the elements of a previous request—in other words, whether the received prediction request and previous prediction request have the same number of elements and the same input and output pairings for each element. If so, control transfers to block 230; otherwise, control progresses to block 240.

At block 240, control generates, for each element in the prediction request, a set of bins based on values in training data. Control creates each set of bins such that every value in the training data that corresponds to the output of the element falls within a bin in the set of bins for that element. Control progresses to block 250, where control builds a classifier for each element in the prediction request based on the set of bins for the element and the training data that corresponds to the element. Control then continues with block 260.

Returning to block 230, control determines whether the training data has changed since the last prediction request was received—for example, whether new data has been added to the historical data store 160. If so, control transfers to block 240, as describe above; otherwise, control continues with block 280. At block 280, control uses the previously created set(s) of bins and the classifiers as the set(s) of bins and classifiers for the elements of the received prediction request. Control continues with block 260.

At block 260, control uses the classifier for each element to create a set of predicted likelihoods for the input for the element included in the prediction request. The set of predicted likelihoods includes, for each bin in the set of bins for an element, the probability that the input for the element included in the prediction request will result in an output that falls within the bin. Control then continues with block 270.

At block 270, control generates a mean vector prediction using the sets of the bins and the classifiers for each element of the prediction request. For example, control may use Equation 1 (above) to create a 1×m vector (μ) and Equation 2 (above) to create an m×m matrix (Σ), where m is the number of elements in the prediction request. Control then outputs μ as the mean vector prediction and Σ as the covariance matrix associated with the mean vector prediction. Control then returns to block 210.

Figure 3:
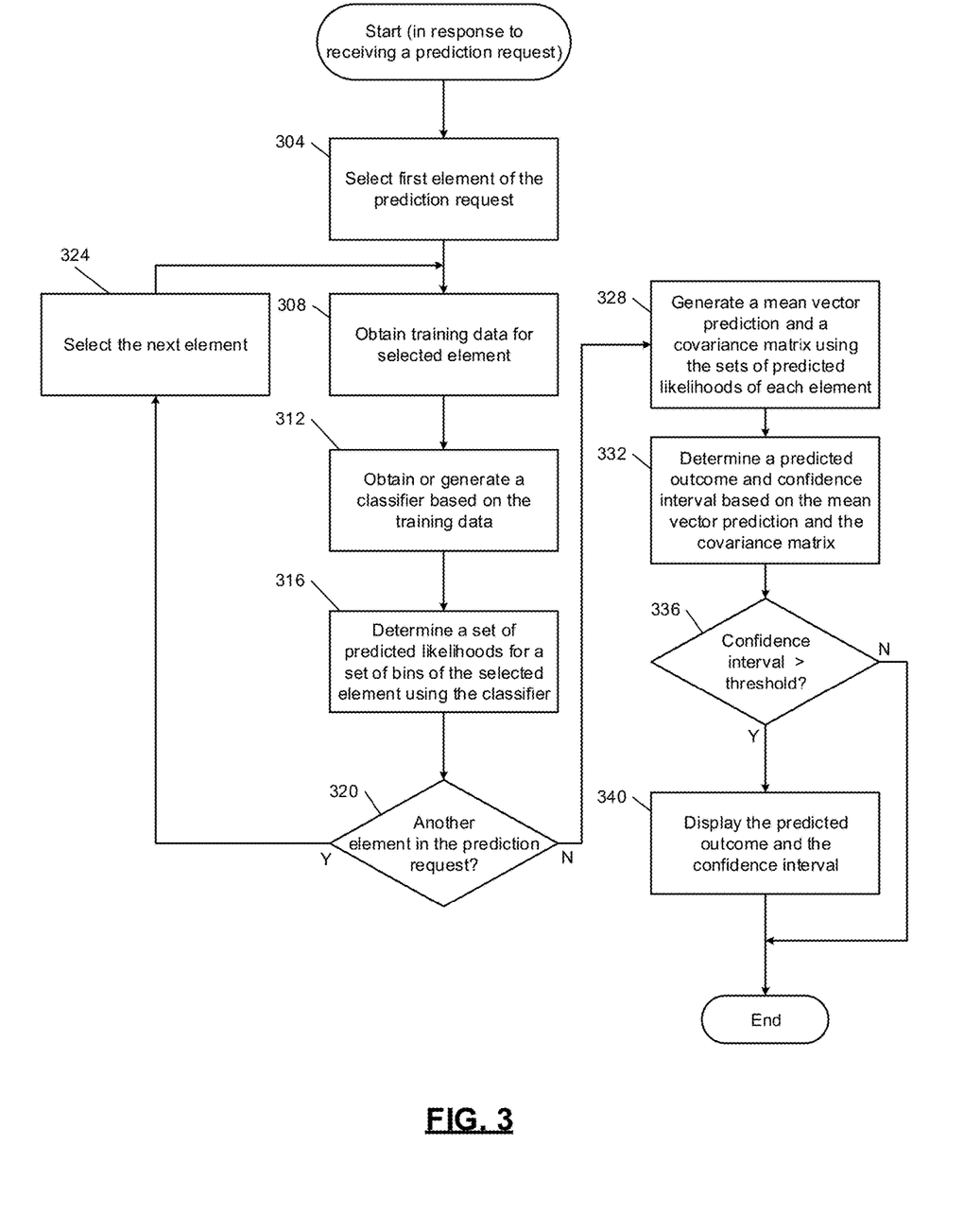
FIG. 3 is a flowchart of example confidence level determination and reporting according to principles of the present disclosure.

FIG. 3 is a flowchart of example confidence level determination and reporting according to principles of the present disclosure. Control begins in response to receiving a prediction request. The prediction request may be a request for predicting particular weather metrics tomorrow based on historical data. In various implementations, the prediction request may be related to predicting human behavior or response to a particular event at some point in the future based on previous behavior stored as training data. That is, the prediction request may be requesting a confidence level of prescription drug adherence tomorrow if an individual was contacted and reminded weekly.

Once the prediction request is received, control proceeds to 304 to select a first element of the prediction request. The prediction request may include many variables that are interdependent or related in some manner, each element is predicted separately as well as with respect to one another (temperature, humidity, etc.). Control proceeds to 308 to obtain training data for the selected element. Control continues to 312 to obtain or generate a classifier based on the training data. As explained in the flowchart of FIG. 2, the previous classifier may be used if the training data is unchanged. However, if, for example, the training data is updated, then new classifiers are generated. In various implementations, the classifiers are stored after each generation in a temporary data store or cache or the historical database in FIG. 1.

Control proceeds to 316 to determine a set of predicted likelihoods for a set of bins of the selected element using the classifier. Then, at 320, control determines whether another element is included in the prediction request. If yes, control continues to 324 to select the next element and return to 308. Otherwise, control proceeds to 328 to generate a mean vector prediction and a covariance matrix using the sets of predicted likelihoods of each element.

At 332, control determines a predicted outcome and a confidence interval based on the mean vector prediction and the covariance matrix. Then, control continues to 336 to determine if the confidence interval is greater than a threshold. If no, control ends. Otherwise, control continues to 340 to display the predicted outcome and confidence interval. In various implementations, the confidence interval represents or is converted to a percentage value.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computerized confidence interval determination system comprising:
   at least one processor and
   memory coupled to the at least one processor,
   wherein the memory stores:
      a historical data store including training data relating to a particular category and previous prediction requests and
      instructions for execution by the at least one processor and
   wherein the instructions include, in response to receiving a prediction request from a user device:
      determining a size of each element of the prediction request;
      obtaining a previous prediction request from the historical data store;
      determining whether a match exists between elements of the prediction request and elements of the previous prediction request, including comparing each element of the prediction request to a respective element of the previous prediction request;
      in response to a determination that a match exists, determining whether the training data has changed since the previous prediction request was made;
      in response to a determination that the training data has not changed:
         obtaining a previously stored classifier, and
         using the previously stored classifier to determine a set of predicted likelihoods;
      in response to any mismatch between the elements of the prediction request and the elements of the previous prediction request, for each element of the prediction request:
         determining a set of bins that correspond to the element based on training data,
         generating an updated classifier based on the training data, and for each bin of the set of bins of the element, determining the set of predicted likelihoods using the updated classifier;

in response to a determination that the training data has changed, for each element of the prediction request:
determining the set of bins that correspond to the element based on training data,
generating the updated classifier based on the training data, and
for each bin of the set of bins of the element, determining the set of predicted likelihoods using the updated classifier;

generating a mean vector prediction and a covariance matrix using the set of bins generated for each element of the prediction request;

determining a predicted outcome and a confidence interval using the mean vector prediction and the covariance matrix; and in response to a determination that the confidence interval exceeds a threshold, outputting, to the user device, the predicted outcome and the confidence interval.

2. The system of claim 1 wherein each set of predicted likelihoods includes a probability that an input of the element of the prediction request produces an output categorized in a corresponding bin of the set of bins.

3. The system of claim 1 wherein the instructions include, for each element of the prediction request, storing the updated classifier.

4. The system of claim 1 wherein each bin of the set of bins is sized based on the training data.

5. The system of claim 1 wherein:
the set of bins includes a total number of bins and
each bin of the set of bins is of varying size.

6. The system of claim 1 wherein the updated classifier for each element is generated based on a value of the training data in each bin.

7. The system of claim 1 wherein each generated classifier implements a corresponding function.

8. The system of claim 1 wherein each generated classifier is generated based on at least one of a softmax classifier, a naive Bayes classifier, a probabilistic classifier, and a statistical regression classifier.

9. The system of claim 1 wherein the particular category is related to at least one of healthcare and weather.

10. A confidence interval determination method comprising:
in response to receiving a prediction request from a user device:
determining a size of each element of the prediction request;
obtaining a previous prediction request from a historical data store, wherein the historical data store includes training data relating to a particular category and previous prediction requests;
determining whether a match exists between elements of the prediction request and elements of the previous prediction request including comparing each element of the prediction request to a respective element of the previous prediction request;
in response to a determination that a match exists, determining whether the training data has changed since the previous prediction request was made;
in response to a determination that the training data has not changed:
obtaining a previously stored classifier; and
using the previously stored classifier to determine a set of predicted likelihoods;

in response to any mismatch between the elements of the prediction request and the elements of the previous prediction request, for each element of the prediction request:
determining a set of bins that correspond to the element based on training data,
generating an updated classifier based on the training data, and
for each bin of the set of bins of the element, determining the set of predicted likelihoods using the updated classifier;

in response to a determination that the training data has changed, for each element of the prediction request:
determining the set of bins that correspond to the element based on training data,
generating the updated classifier based on the training data, and
for each bin of the set of bins of the element, determining the set of predicted likelihoods using the updated classifier;

generating a mean vector prediction and a covariance matrix using the set of bins generated for each element of the prediction request;

determining a predicted outcome and a confidence interval using the mean vector prediction and the covariance matrix; and in response to a determination that the confidence interval exceeds a threshold, outputting, to the user device, the predicted outcome and the confidence interval.

11. The method of claim 10 wherein each set of predicted likelihoods includes a probability that an input of the element of the prediction request produces an output categorized in a corresponding bin of the set of bins.

12. The method of claim 10 wherein each generated classifier implements a corresponding function.

13. The system of claim 1 wherein generating the mean vector prediction and the covariance matrix includes performing calculations based on the set of predicted likelihoods of each bin and one or more bin definitions.

14. The system of claim 1 wherein determining the set of predicted likelihoods for a first element of the prediction request includes determining, for each bin in the set of bins for the first element, a probability that an input of the first element produces an output categorized in the bin.

15. The system of claim 1 wherein comparing each element of the prediction request to the respective element of the previous prediction request includes comparing the size of the element to a size of the respective element.

16. The method of claim 10 wherein generating the mean vector prediction and the covariance matrix includes performing calculations based on the set of predicted likelihoods of each bin and one or more bin definitions.

17. The method of claim 10 wherein determining the set of predicted likelihoods for a first element of the prediction request includes determining, for each bin in the set of bins for the first element, a probability that an input of the first element produces an output categorized in the bin.

18. The method of claim 10 wherein comparing each element of the prediction request to the respective element of the previous prediction request includes comparing the size of the element to a size of the respective element.

* * * * *